United States Patent
Hwang

(10) Patent No.: US 7,529,352 B2
(45) Date of Patent: May 5, 2009

(54) SYSTEM AND METHOD TO PROVIDE LOCAL SERVICE FOR ALL EMERGENCY SERVICES NUMBERS AND TO PROVIDE LANGUAGE ASSISTANCE FOR CALLS TO SUCH NUMBERS

(75) Inventor: Kuen-Yih Hwang, Naperville, IL (US)

(73) Assignee: Intrado Inc., Longmont, CO (US)

( * ) Notice: Subject to any disclaimer, the term of this patent is extended or adjusted under 35 U.S.C. 154(b) by 280 days.

(21) Appl. No.: 11/458,438

(22) Filed: Jul. 19, 2006

(65) Prior Publication Data

US 2007/0071181 A1 Mar. 29, 2007

Related U.S. Application Data

(60) Provisional application No. 60/719,677, filed on Sep. 22, 2005.

(51) Int. Cl.
*H04M 11/02* (2006.01)
*G10L 21/00* (2006.01)

(52) U.S. Cl. ............... 379/45; 379/37; 379/38

(58) Field of Classification Search ......... 379/37–50, 379/245, 201.01, 265.12, 134; 455/445, 455/66, 433, 563; 704/270–277
See application file for complete search history.

(56) References Cited

U.S. PATENT DOCUMENTS

| 5,602,901 | A | 2/1997 | Redden et al. |
|---|---|---|---|
| 6,078,804 | A | 6/2000 | Alperovich et al. |
| 6,600,811 | B1 * | 7/2003 | Patel et al. ............ 379/45 |
| 6,925,155 | B2 | 8/2005 | Reynolds et al. |
| 7,349,843 | B1 * | 3/2008 | Beck .................. 704/231 |
| 2001/0021646 | A1 | 9/2001 | Antonucci et al. |
| 2001/0028711 | A1 * | 10/2001 | Antonucci et al. ...... 379/245 |
| 2001/0051514 | A1 * | 12/2001 | Lindholm ............ 455/404 |
| 2002/0034960 | A1 | 3/2002 | Muranaga |
| 2004/0014462 | A1 | 1/2004 | Surette |
| 2006/0047412 | A1 | 3/2006 | Lin |

FOREIGN PATENT DOCUMENTS

EP 1594324 11/2005

* cited by examiner

*Primary Examiner*—Melur Ramakrishnaiah

(57) ABSTRACT

A system and method to enable a local communications systems to respond appropriately to all extra-jurisdictional emergency dialing numbers by connecting the call to an interactive emergency language system. Additionally, and importantly, the system uses the dialed emergency services number as an initial indication that the caller may need a translator, an emergency services operator that has language skills associated with the country or countries where the emergency dialing code is used, or both. The interactive emergency language system interactively determines the preferred language of the caller and causes the call to be routed to a public safety answering point position that has the appropriate language skills. If the language cannot be determined or there is no local support for the selected language, then the call is bridged to a translation agency and the call is routed to the PSAP that serves the geographic location of the caller.

9 Claims, 5 Drawing Sheets

SYSTEM AND METHOD TO PROVIDE LOCAL SERVICE FOR ALL EMERGENCY SERVICES NUMBERS AND TO PROVIDE LANGUAGE ASSISTANCE FOR CALLS TO SUCH NUMBERS

CROSS REFERENCE TO RELATED APPLICATION

This application is related to and claims the benefit of U.S. Provisional Patent Application No. 60/719,677 filed Sep. 22, 2005 and entitled "System and Method to Provide Local Service for All Emergency Services Numbers and to Provide Language Assistance for Calls to Such Numbers," which is incorporated herein by reference in its entirety.

BACKGROUND OF THE INVENTION

The present invention is directed to providing emergency service responsive to a plurality of easy-to-remember numbers, and, more specifically, to a system and method that routes calls to an answering point that serves the area where the call was made responsive to any of the world's recognized emergency services numbers and to provide rapid selection of language support for such calls.

Many, if not most, of the countries in the world have easy-to-remember emergency services telephone numbers that connect a caller to an emergency services operator. Most of these emergency services telephone numbers comprise two or three easy to remember digits. Some countries use one emergency services telephone number for all emergencies and some countries use a separate emergency services telephone number for fire, ambulance and police emergencies. Further, the GSM wireless service standard requires that the emergency services telephone number is 1-1-2, wherever in the world the GSM standard is implemented.

It is therefore incumbent on a traveler to know the various emergency services numbers of the country he or she is in and to know what number to dial from a specific type of telephone. A person living in the United States or Canada dials 9-1-1 for all emergency services. When that person travels to Austria, for example, she or he must know that the number to dial for police is 1-3-3, for ambulance is 1-4-4 and for fire is 1-2-2. Furthermore, if that person is using GSM-based mobile telephone service in Austria, the number to dial for all emergency services is 1-1-2.

While these differences may seem trivial, a person dialing an emergency services number is very likely to be under stress and therefore less likely to remember the finer points of unfamiliar emergency dialing plans, if he or she knew them in the first instance. The person may also be using a telephone with an unfamiliar user interface (e.g., a borrowed or rented mobile telephone). Even if the person dials the correct emergency services number, there may be a problem determining the caller's language and finding an emergency services operator that speaks that language or finding a translator to work with the emergency services operator. One common issue that emergency services operators encounter is that the more time it takes to communication with a caller, the more upset the caller will be. If an emergency call takes subjectively "too long" to set up, the caller is likely to disconnect and start the process over again.

Therefore, there is a problem in the art that a person trying to place an emergency call in a foreign jurisdiction using his or her home country's emergency services telephone number is likely to have problems finding the right emergency access code and then overcoming the language barrier.

SUMMARY OF THE INVENTION

This problem is solved and a technical advance is achieved in the art by a system and method that enables communications systems to respond appropriately to any of the world's recognized emergency services number and to connect the call to an interactive emergency language system. Additionally, and importantly, the system uses the dialed emergency services number as an initial indication that the caller may need a translator, an emergency services operator that has language skills associated with the country or countries where the emergency dialing code is used or both.

In accordance with one exemplary embodiment of this invention, an interactive emergency language system maintains a database of all emergency services numbers recognized throughout the world and the language or languages associated with each. The interactive emergency language system is connected to a communications network. When any emergency services number is dialed in the communications network, a switching service point handling the call origination extends the call and transmits the dialed digits. The interactive emergency language system first determines whether the dialed digits comprise a recognized emergency services number anywhere in the world. If not, the interactive emergency language system returns an indication that the digits are unknown to the switching service point.

If the dialed digits are recognized as an emergency services number, the interactive emergency language system determines which language or languages are associated with the dialed emergency services number. If only one language is associated with the dialed emergency services number, the interactive emergency language system prompts the caller to confirm the language. When there are two or more languages associated with the dialed number, the interactive emergency language system prompts the caller for language preference. Such prompting may be accomplished by presenting a menu of languages or by requesting the caller to speak and determining the language from the spoken words.

When the interactive emergency language system determines a preferred language, it determines which public safety answering point (PSAP) has one or more operators that speak the preferred language. The interactive emergency language system then sends routing information back to the requesting switching service point. The switching service point extends the call through the communications network to the indicated PSAP and to an operator that speaks the preferred language. The PSAP then obtains location information, call-back information, etc., from the network using known techniques.

In those instances where dialed digits are recognized as an emergency services number but the caller's language cannot be determined, the interactive emergency language system causes the voice path of the call to be routed to a translation agency. The translation agency determines which language is being spoken and, optionally, whether there is an emergency. The call is then extended to the PSAP that handles calls from the location of the caller, whereby a three-way call is established among the caller, a translator and an emergency services operator at the PSAP.

Thus, this invention provides more immediate and meaningful emergency services for a person who may not speak the local language. A caller dialing any known emergency services number may be connected to a PSAP where the caller's language is spoken or connected to a translation agency and to the PSAP that serves the geographic location of the caller. Furthermore, a person temporarily or permanently residing in a jurisdiction where his or her primary (or only) language is not the official or primary language, she or he may dial an emergency services number that will connect the caller to an emergency services operator with appropriate language skills or a translator with minimal delay.

BRIEF DESCRIPTION OF THE DRAWINGS

A more complete understanding of this invention may be obtained from a consideration of this specification taken in conjunction with the drawings, in which.

DETAILED DESCRIPTION

Figure 1:
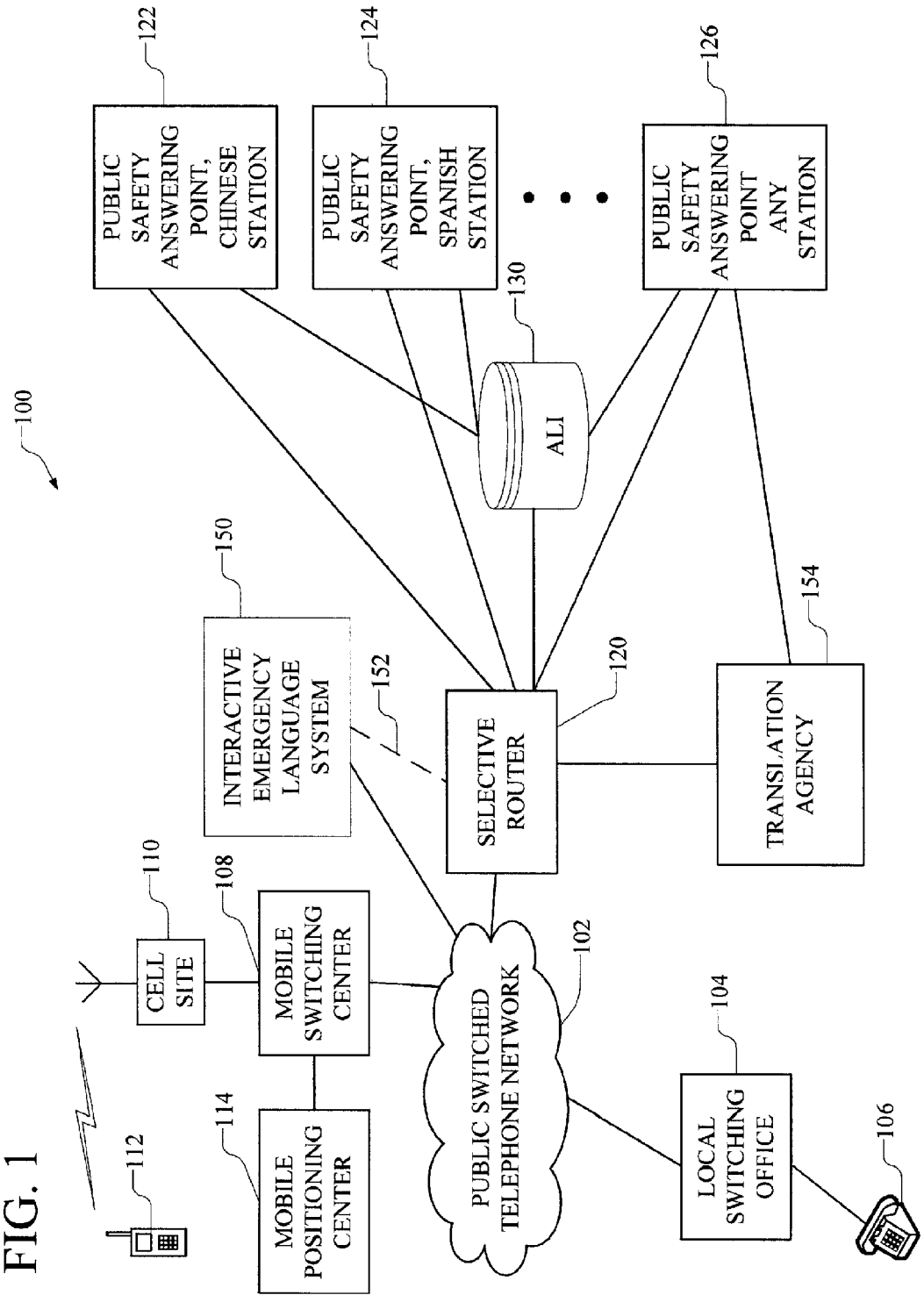
FIG. 1 depicts a communications network in accordance with an embodiment of the present invention.

With reference now to FIG. 1, a communications network 100 in accordance with an embodiment of the present invention is illustrated. In general, communications network 100 comprises the publicly switched telephone network (PSTN) 102. While only one network (102) is shown in FIG. 1, one skilled in the art understands that PSTN 102 comprises multiple networks, which include both voice networks and signaling networks. Further, one skilled in the art understands that the various components specifically illustrated herein may comprise components of PSTN 102. Communications network 100 also includes switching service points, represented by local switching office 104, which is connected to a plurality of landline telephones, represented by telephone 106.

Another switching service point, mobile switching center 108, is also illustrated as connected to PSTN 102. Mobile switching center 108 is connected to a plurality of cell sites, represented by cell site 110, to provide wireless service for a plurality of mobile communications devices, represented by mobile telephone 112. A mobile positioning center 114 is also connected to mobile switching center 108, as is known in the art. Mobile positioning center 114 obtains and stores location data relating to mobile communications devices within its service region, such as mobile telephone 112.

PSTN 102 is connected to one or more selective routers, which is represented here by selective router 120. Selective router 120, in turn, is connected to a plurality of public safety answering points (PSAP's), represented in FIG. 1 by PSAP 122, PSAP 124 and PSAP 126. As is known in the art, selective router 120 routes emergency calls to one of PSAP 122, PSAP 124 or PSAP 126, depending upon where the calling communications device, an presumably the caller, is located. PSAP's 122, 124 and 126 are connected to an automatic location information (ALI) database 130.

ALI database includes static location information for landline telephones, such as telephone 106 and may also include dynamic information regarding mobile communication devices, such as mobile telephone 112. To obtain dynamic location information, ALI database 130 cooperates with mobile switching center 108, mobile positioning center 114 or both (these connections are not illustrated herein for clarity). Such cooperation is known in the art and therefore is not discussed further. Selective router 120 may also use information stored in ALI database 130 in order to route emergency calls, or may use information from a similar database.

In accordance with the prior art, all switching service points in the U.S., such as switching office 104 and mobile switching center 108, are programmed to recognize 9-1-1 during digit collection. When 9-1-1 is recognized, a trunk to selective router 120 is selected and a caller identification number delivered to selective router 120.

In accordance with this invention, all switching service points, such as local switching office 104, and mobile switching center 108, are programmed to recognize emergency services numbers of other jurisdictions. For example, when a foreign emergency services number is recognized, local switching office 104 routes the call to an interactive emergency language system 150, in accordance with this invention. Alternatively, if local switching office 104 times out during digit collection after two or three digits (the length of most emergency services numbers) and the collected digits do not comprise number is not the local emergency services number, then the call may be delivered to interactive emergency language system 150.

During mobile call set up, mobile switching center 108 receives a set up message from mobile telephone 112 that includes the dialed digits. Mobile switching center 114 is also programmed to recognize emergency services numbers of other jurisdictions. Alternatively, if there are only two or three digits in the set up message and the digits are not the local emergency services number, then mobile switching center 108 routes the call through PSTN 102 to interactive emergency language system 150.

In another exemplary embodiment, calls that appear to be extra-jurisdictional emergency services numbers from local switching office 104 and mobile switching center 108 are directed to selective router 120, which then connects the call to interactive emergency language system 150 via a communications path represented by dashed line 152.

Interactive emergency language system 150 receives the call and the dialed digits. Interactive emergency language system 150, as will be described further, below, first determines if the digits are in fact a recognized emergency services number by comparing the received digits with emergency services numbers stored in its internal database. If the received digits match an emergency service number in the database, then interactive emergency language system 150 retrieves the language or languages associated with that emergency code. Interactive emergency language system 150 then requests that the caller verify a language by selecting one from a list or by eliciting a vocal response.

When interactive emergency language system 150 has determined a language, it sends a message back to local switching office 104 or mobile switching center 108 containing routing information to route the call to a specific language-enabled PSAP. Alternatively, interactive emergency language system 150 sends the identification of a specific language-enable PSAP to selective router 120. The identified language-enabled PSAP need not be the primary PSAP for the jurisdiction where the call originated.

In one example, PSAP 126 receives emergency calls for the jurisdiction in which telephone 106 is located. However, an emergency call may be routed to PSAP 122 if the caller dialed the emergency code for Hong Kong (9-9-9) and interactive emergency language system 150 determined that the preferred language for the caller was Chinese. Likewise, if the user of telephone 106 dialed an emergency code for Mexico (0-6-0 or 0-8-0), the call is routed to PSAP 124.

In accordance with a further aspect of this invention, interactive emergency language system 150 may cause a call to be routed to a translation agency 154 for determination of the caller's language. Translation agency 154 determines the language of the caller while the call is being set up to the PSAP that serves the jurisdiction where the calling communication device is located (e.g., PSAP 126). The call is then bridged so that translation agency 154 interprets between the caller and the call taker at PSAP 126.

Figure 2:
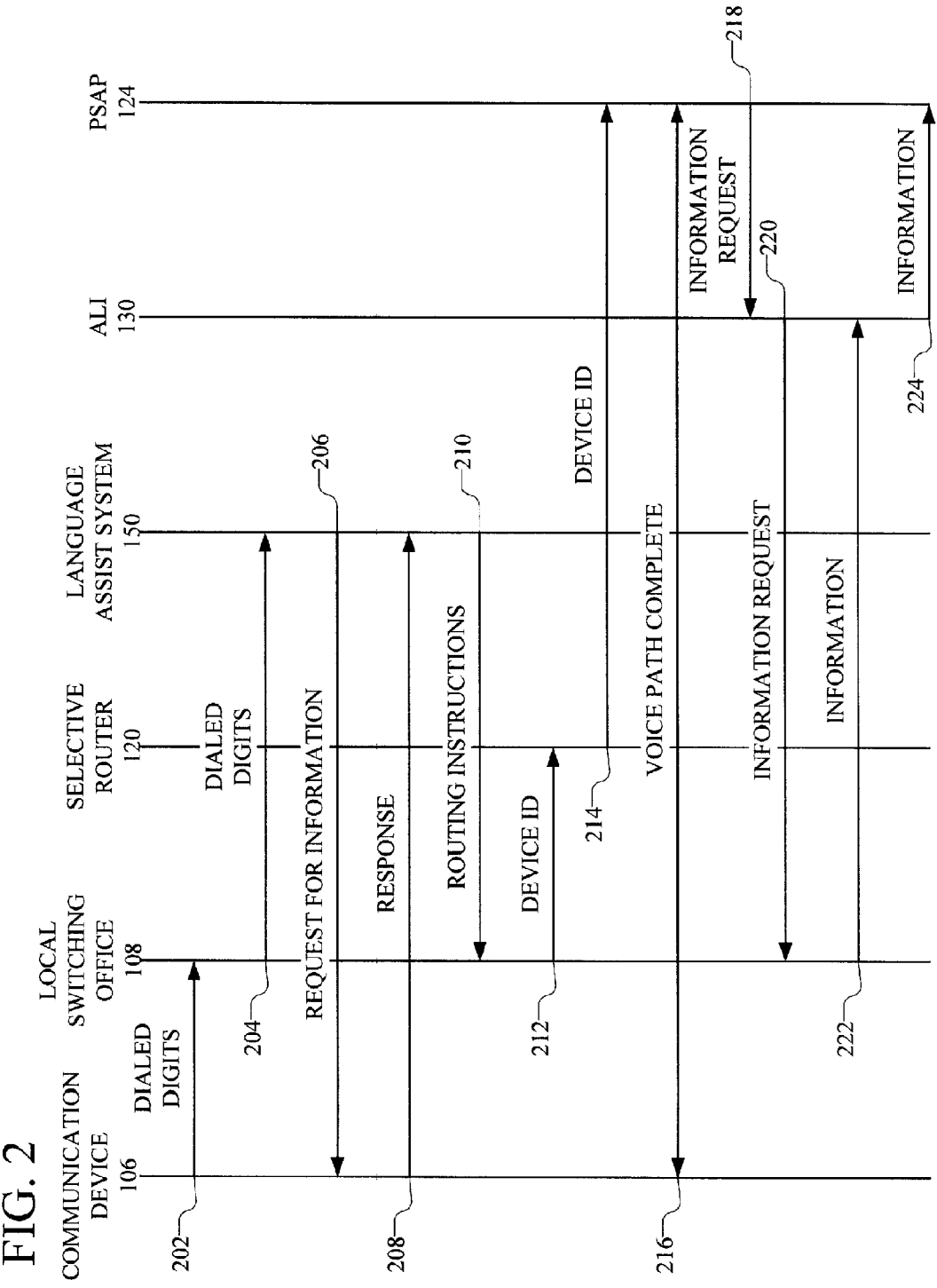
FIG. 2 depicts a call flow through the communications network of FIG. 1 in accordance with an embodiment of the present invention.

FIG. 2 is an illustration of a call flow of an exemplary embodiment of the present invention in the context of a landline call. In this context, each point of the network participating in call processing is labeled in accordance with FIG. 1. Thus, calling starts at 202 wherein a caller at telephone 106 dials an extra-jurisdictional emergency services number. For purposes of this illustration, the caller dialed 0-8-0, one of the emergency services numbers of Mexico. Local switching office 108 translates the dialed digits and determines that an extra-jurisdictional emergency services number was dialed. In step 204, local switching office extends the call through PSTN 102 to interactive emergency language system 150. Interactive emergency language system 150 verifies that the dialed digits are a valid emergency services number (Mexico, in this example) and determines that the primary language is Spanish. Interactive emergency language system 150 verifies the language selection in step 206 and receives a response in 208. (This step could iterate if there are multiple languages associated with a particular emergency services number, such as 1-1-2.)

Assuming the response in step 208 confirmed the language selection, interactive emergency language system 150 sends routing instructions to local switching office 108 to route the call to PSAP 124. Local switching office 108 routes the call to a selective router 120 according to the instructions from interactive emergency language system 150 in step 212. In step 214, selective router 120 extends the call to PSAP 124. A voice path is then complete in step 216.

Advantageously, such routing instructions may comprise an emergency services routing number (ESRN) and an emergency services query key (ESQK). An ESRN comprises a ten-digit number, resembling a telephone number, that uniquely identifies a selective router. Use of an ESRN is especially advantageous, when there is more than one selective router in the service area or when an operator position is required in a different service area for language capability. An ESQK identifies a specific PSAP served by the selective router and also is a query key for retrieval of specific information and location information regarding the call. For more information regarding ESRN and ESQK, see U.S. patent application Ser. No. 10/277,438 entitled "Geographic Routing of Emergency Service Cal Center Emergency Calls," which was filed Oct. 21, 2002, assigned to the assignee of this invention, and is incorporated herein by reference in its entirety.

In step 218, PSAP 124 requests information from ALI database 130. Optionally, ALI database 130 requests information regarding the location of the caller from the local switching office in step 220. Step 220 is always performed when the switching office handling the call is a mobile switching office, such as mobile switching center 108. Furthermore, step 220 may also be a request from ALI database 130 to another ALI database (not shown) for information (as would be the case, for example, if ALI database 130 does not contain information for the geographic area where the call originated). Information is returned in step 222 to ALI database 130, which forwards the information to PSAP 124.

Figure 3:
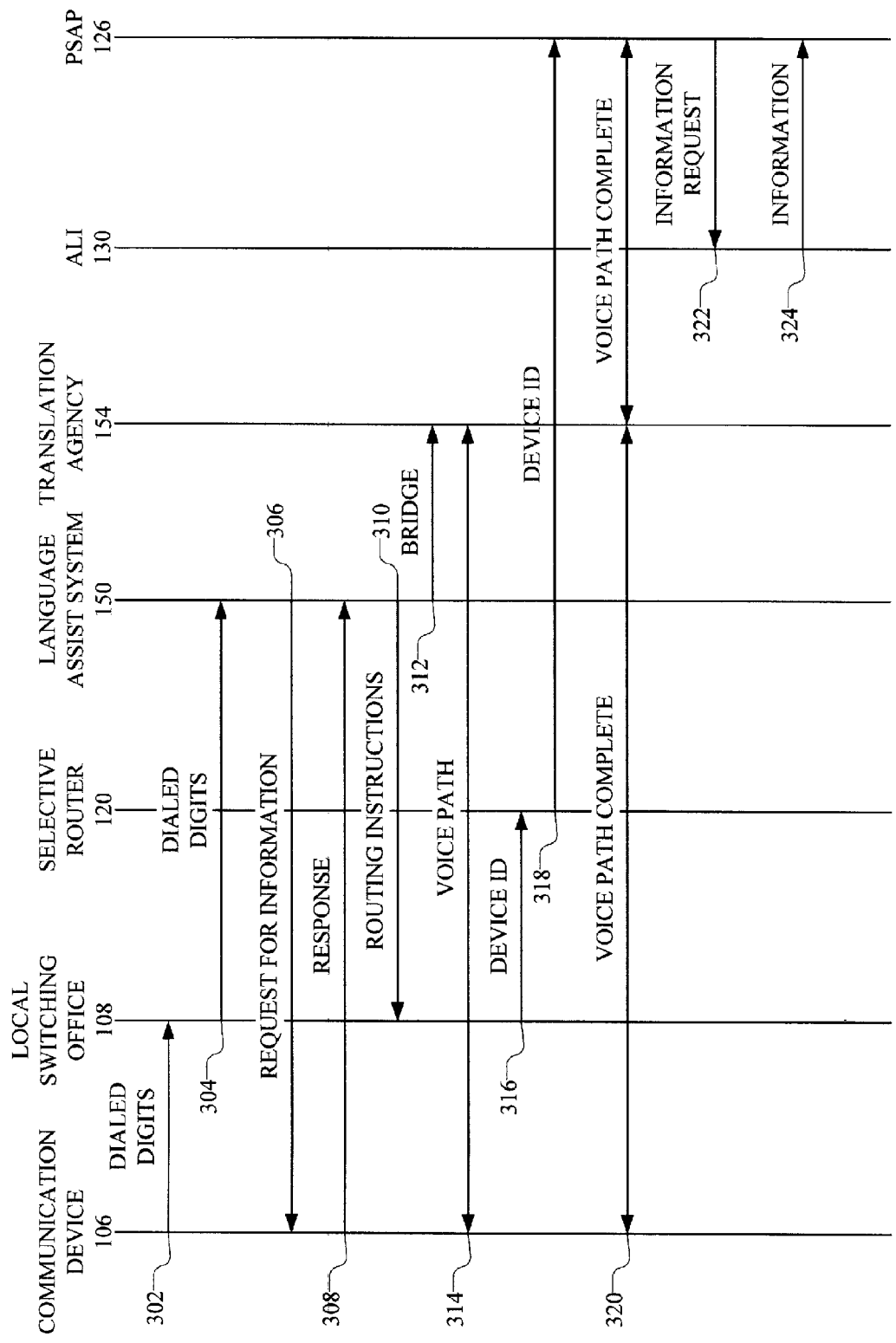
FIG. 3 depicts a call flow through the communications network of FIG. 1 in accordance with another embodiment of the present invention.

Turning now to FIG. 3, a call flow is shown for an alternative embodiment of the present invention. This embodiment illustrates bridging (also known in the art as "conferencing") a translation agency into the call. In step 302, the caller at telephone 106 dials what appears to be an emergency services number from another jurisdiction. Local switching office 108 receives the dialed digits and forwards the dialed digits to interactive emergency language system 150 in step 304. In this exemplary embodiment, interactive emergency language system 150 recognizes the dialed digits as a valid emergency services number.

Advantageously, in step 308 interactive emergency language system 150 attempts to communicate with the caller in order to determine the caller's language. If interactive emergency language system 150 cannot determine the callers language from a response in step 308, interactive emergency language system 150 informs local switching office 108 to route the call as if the caller dialed the local emergency services number in step 310. Additionally, interactive emergency language system 150 causes the call to be bridged to translation agency 154 in step 312 and connects the translation agency 154 to the communication device 106 in step 314. Translation agency 154 determines the required translator and may attempt to determine the nature of the call.

As step 314 is progressing, local switching office 108 sets up a call to selective router 316, passing the device identification. Selective router 120 connects the call to the PSAP that handles calls for the geographical location of the caller in step 318. A voice path is competed in step 320 wherein the caller is connected to PSAP 126 and a translator at translation agency 154. Call processing continues as a normal emergency call, wherein PSAP 126 queries ALI database 130 for location information regarding the calling telephone number. The information is returned in step 324.

While the call flows of this invention are described generally in terms of a landline call, one skilled in the art will appreciate how to add the additional steps of this invention to wireless calls after studying this specification. Further, one skilled in the art will appreciate how to add the additional steps of this invention to other types of calls, such as voice over internet protocol (VoIP), etc.

Figure 4:
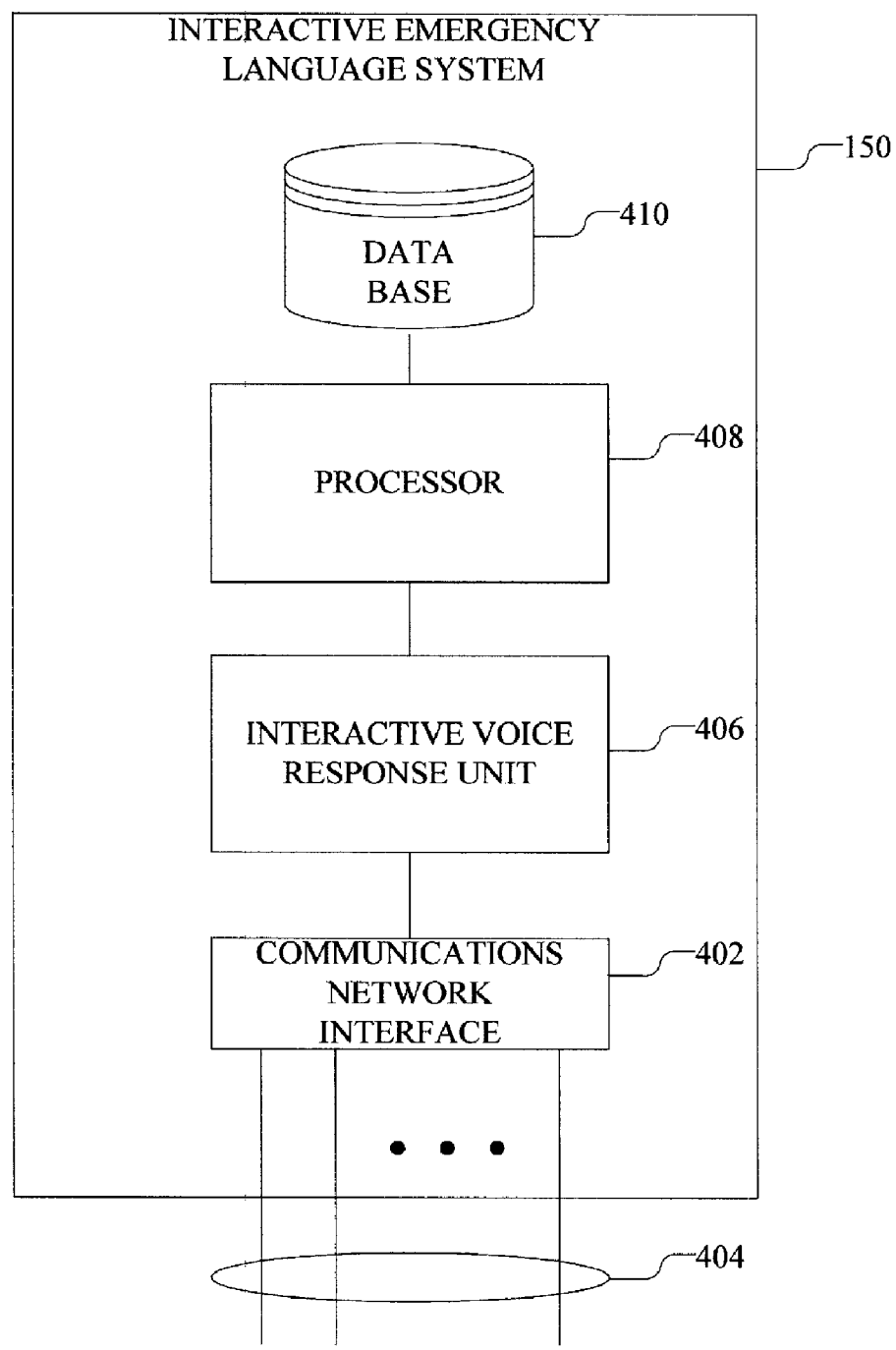
FIG. 4 is a block diagram depicting components of an interactive emergency language system of FIG. 1 in accordance with one embodiment of the present invention.

Turning now to FIG. 4, a block diagram of an interactive emergency language system 150 in accordance with an aspect of this invention is illustrated. Interactive emergency language system 150 is illustrated herein as connected to communications network 100 at a communications network interface 402 via a plurality of lines 404. Lines 404 may be individual data network lines if interactive emergency language system 150 is connected to communications network via Internet Protocol, for example. Alternatively, lines 404 may comprise trunks or other communications channels. Communications network interface 402 performs protocol conversion and terminates individual connections to serve a plurality of calls generally simultaneously.

Communications network interface 402 is connected to interactive voice response unit 406, which receives dual-tone, multi-frequency (DTMF) signals, voice signals from a caller or both. Interactive voice response unit 406 also provides outgoing recorded or synthesized voice as prompts or confirmation responses to callers.

Communications network interface 402 and interactive voice response unit 406 are under the control of processor 408. Processor 408 comprises a stored program controlled processor as is known in the art. Processor 408 stores operational data, operational programs and language information in database 410. Database 410 also stores records comprising emergency services numbers from all jurisdictions and the language or languages generally associated with each jurisdiction.

Interactive emergency language system 150, as illustrated in this exemplary embodiment, comprises a computer or server that is connected to and in communication with communications network 100. Interactive emergency language system 150 may also comprise a subsystem on another node in communications network 100, such as a service control point. Furthermore, interactive emergency language system 150 may comprise a subsystem or an adjunct to selective router 120. It is within the ability of one skilled in the art to build or incorporate the functionality of interactive emergency language system 150 in any appropriate communications network node after studying this specification.

Figure 5:
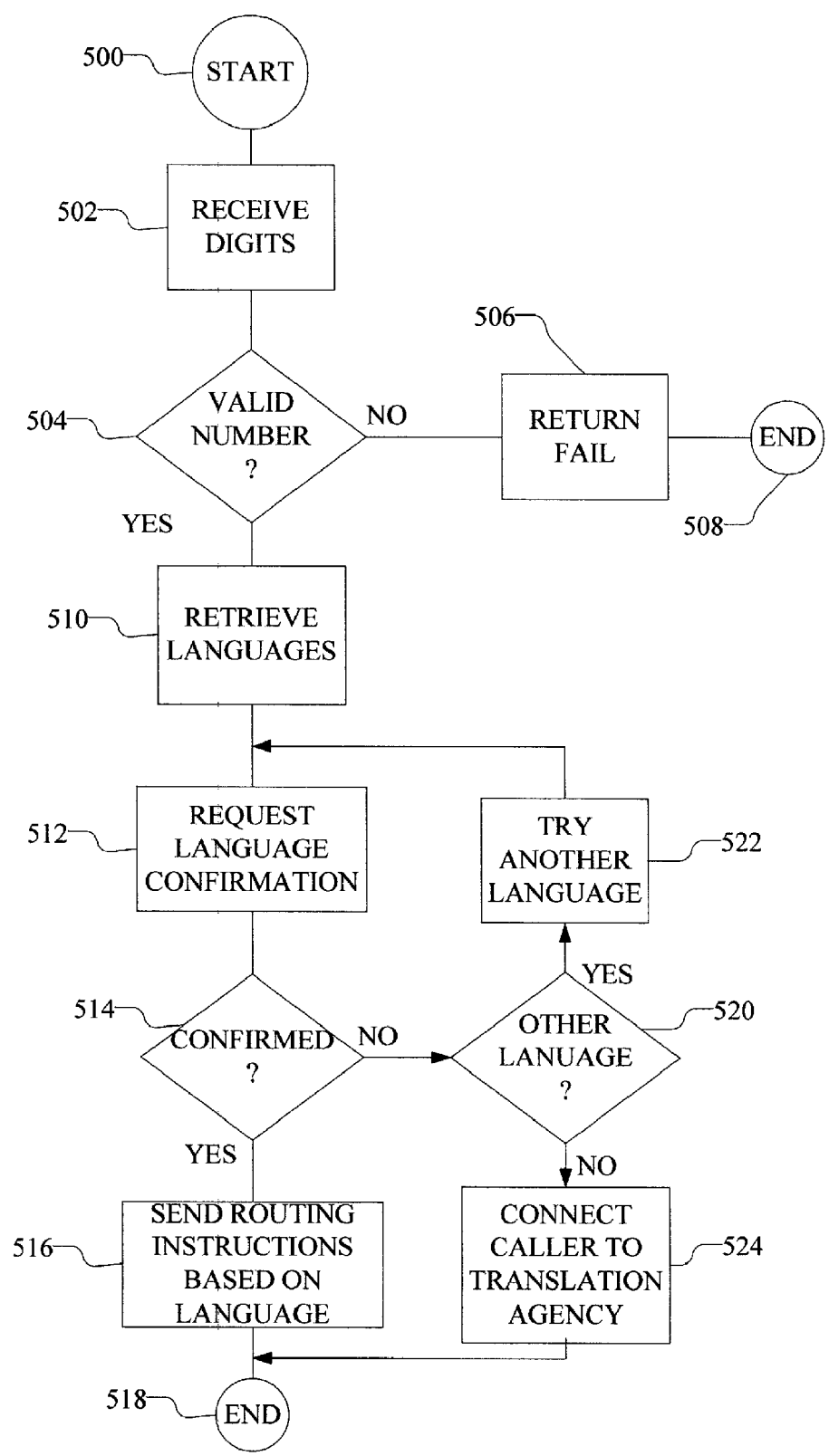
FIG. 5 is a flow diagram depicting the operation of the interactive emergency language system of FIG. 4.

Turning now to FIG. 5, a flowchart of operation of an interactive emergency language system 150 of FIG. 4 is illustrated. Processing starts in circle 500 and proceeds to action box 502, where digits that might comprise an emergency services number are received. In decision diamond 504, a determination is made whether the received digits are valid, that is, if the received digits match any known emergency services number in database 410. If the digits are not valid, then a failure code is returned to the enquiring switching service point in action box 506 and processing ends in circle 508.

If, in decision diamond 504, the received digits comprise a valid number, then processing proceeds to action box 510 where the language or languages associated with the emergency services number are retrieved. In action box 512, the caller is prompted to confirm a preferred language. This step may comprise presenting a menu of languages to the caller and having the caller press or say a selection or may deliver a prompt in each language and wait for a caller's response.

In decision diamond 514, a determination is made whether a language is confirmed or selected. If a language is confirmed (or selected) by the caller, then processing proceeds to action box 516, where routing instructions are sent back to the requesting switching service point to deliver the call to a PSAP that has an operator position where the selected language is spoken. Alternatively, if there is no PSAP with an operator position that speaks the selected language, then routing instructions are sent back to the requesting switching service point to connect the caller to a translation agency and also connect the call to the PSAP that serves the location of the caller. Processing ends in circle 518.

If, in decision diamond 514, a language is not confirmed, then a determination is made whether there are one or more other languages available in database 410. There may be several menus required, for example, for 1-1-2 because of all of the countries that use 1-1-2 for (at least one of) its emergency services number. If there are other languages available, then, in action box 522, another language (or set of languages) is tried. Processing loops back to action box 512.

If, in decision diamond 514, there are no more languages associated with the dialed emergency services number in database 152, then processing moves to action box 524. In action box 524, the call is routed to a translation agency as described above, in connection with FIGS. 1 and 3. Processing ends in circle 518.

It is to be understood that the above-described embodiment is merely illustrative of the present invention and that may variations can be devised by one skilled in the art without departing from the scope of the invention. For example, a plurality of emergency services number can be used in one jurisdiction in order to reach an emergency services operator that speaks a particular language. In the United States, for example, calls to 9-1-1 are directed to English speaking operators, calls to 0-8-0 are directed to Spanish speaking operators, calls to 9-9-9 are directed to Chinese speaking operators, etc. It is therefore intended that such variations be included within the scope of the following claims and their equivalents.

The invention claimed is:

1. A method for routing a call from a caller to an emergency services operator comprising:
    receiving a plurality of dialed digits, said plurality comprising fewer than seven;
    determining whether said plurality of dialed digits matches an emergency services number used anywhere in the world;
    determining a plurality of languages associated with a jurisdiction associated with said emergency number;
    determining a preferred language of said call from said plurality of languages;
    routing said call to an emergency services operator position capable of communicating in said preferred language.

2. A method in accordance with claim 1 further comprising:
    determining a language associated with a jurisdiction wherein the plurality of dialed digits comprises an emergency services number, and
    wherein said step of routing said call comprises routing said call to an emergency services operator position wherein the determined language is understood.

3. A method in accordance with claim 2 wherein the step of determining a language comprises automatically determining a language at an interactive emergency language system.

4. A method in accordance with claim 2 wherein the step of determining a language comprises routing said call to a translation agency and determining said language by a translator at said translation agency.

5. A method in accordance with claim 4 wherein routing said call comprises bridging said call among said caller, said emergency services operator position and said translation agency.

6. A method in accordance with claim 1 further including:
    if said plurality of dialed digits comprises an extra-jurisdictional emergency services number, routing said call to an interactive emergency language system.

7. An interactive emergency language system comprising:
    an interface to a communications network;
    a processor connected to said interface, wherein said processor is configured to interact with a caller to determine a preferred language for said caller, determine an emergency services operator position where the preferred language is understood, retrieve routing instructions for routing said call to said operator position and return said routing instructions to said communications network, and
    wherein said processor is also configured to return routing instructions to the network to route the call to a translation agency if said processor cannot determine the caller's preferred language.

8. An interactive emergency language system in accordance with claim 7 wherein said processor is further configured to receive the dialed digits, determine a language associated with said dialed digits and query said caller to determine whether the caller understands the determined language.

9. An interactive emergency language system in accordance with claim 7 wherein said processor is further configured to received the dialed digits, determine a plurality of languages associated with said dialed digits and iteratively query the caller to determine the caller's preferred language.

* * * * *